United States Patent [19]
Walton

[11] Patent Number: 5,170,848
[45] Date of Patent: Dec. 15, 1992

[54] SOD CUTTING MACHINE

[76] Inventor: Wayman E. Walton, 7355 Agate St., Rancho Cucamonga, Calif. 91730

[21] Appl. No.: 730,000

[22] Filed: Jul. 15, 1991

[51] Int. Cl.5 .......................... A01B 45/04; A01B 35/32
[52] U.S. Cl. ...................................... 172/19; 172/126; 172/430; 172/674
[58] Field of Search ........................ 172/19, 20, 15, 17, 172/126, 471, 470, 469, 468, 430, 439, 735, 725, 191, 734, 662, 674

[56] References Cited

U.S. PATENT DOCUMENTS

| | | | |
|---|---|---|---|
| 637,939 | 11/1899 | Murray | 172/430 |
| 1,279,031 | 9/1918 | Sprott | 172/430 |
| 1,706,831 | 3/1929 | Watson | 172/20 |
| 2,555,954 | 6/1951 | Bruflat | 172/430 |
| 2,617,347 | 11/1952 | Provost | 172/20 |
| 3,028,678 | 4/1962 | Bakehouse | 172/430 |
| 3,357,499 | 12/1967 | Finneyfrock | 172/19 |
| 3,511,316 | 5/1970 | Oerman et al. | 172/126 |
| 3,669,195 | 6/1972 | Green et al. | 172/126 |
| 3,795,415 | 3/1974 | Koch et al. | 172/439 |
| 4,360,066 | 11/1982 | Mann | 172/469 |
| 4,612,997 | 9/1986 | Wilkins | 172/776 |
| 4,632,192 | 12/1986 | Hooks | 172/462 |
| 4,738,317 | 4/1988 | Bedney | 172/674 |
| 4,800,964 | 1/1989 | Rettig et al. | 172/711 |
| 4,892,153 | 1/1990 | Cooling et al. | 172/20 |
| 4,911,248 | 3/1990 | Schrepfer | 172/470 |
| 5,094,300 | 3/1992 | Jurgena | 172/191 |

FOREIGN PATENT DOCUMENTS

| | | | |
|---|---|---|---|
| 1153757 | 3/1958 | France | 172/662 |

Primary Examiner—Randolph A. Reese
Assistant Examiner—Spencer Warnick
Attorney, Agent, or Firm—Boniard I. Brown

[57] ABSTRACT

A sod cutting machine that includes a towable frame and a series of parallel trailing suspension arms, each suspension arm having a sod cutter disk and roller device for limiting the cutting depth of the disk. Each suspension arm is independently swingably attached to the frame so that each cutter disk achieves a proper cutting depth. A marking and tracking system is provided to maintain a desired parallelism and even spacing between the cuts in successive passes of the machine. The frame can be actuated to raise selected ones of the suspension arms in order to vary the slit spacing, thus to form elongated rectangular sod sections.

9 Claims, 3 Drawing Sheets

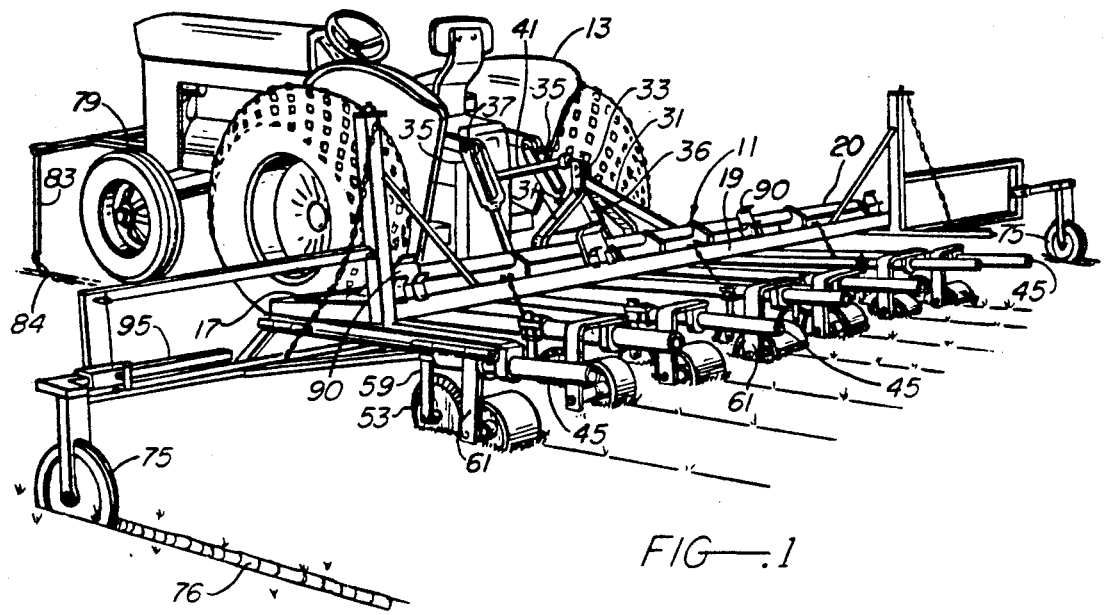
FIG—.1
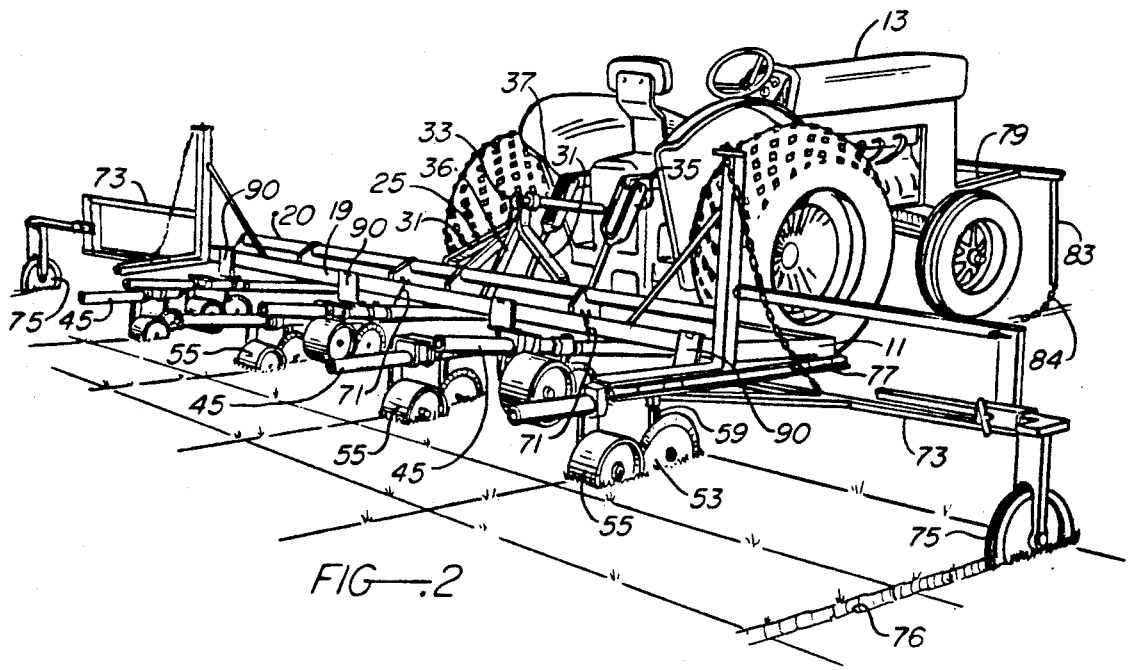
FIG—.2

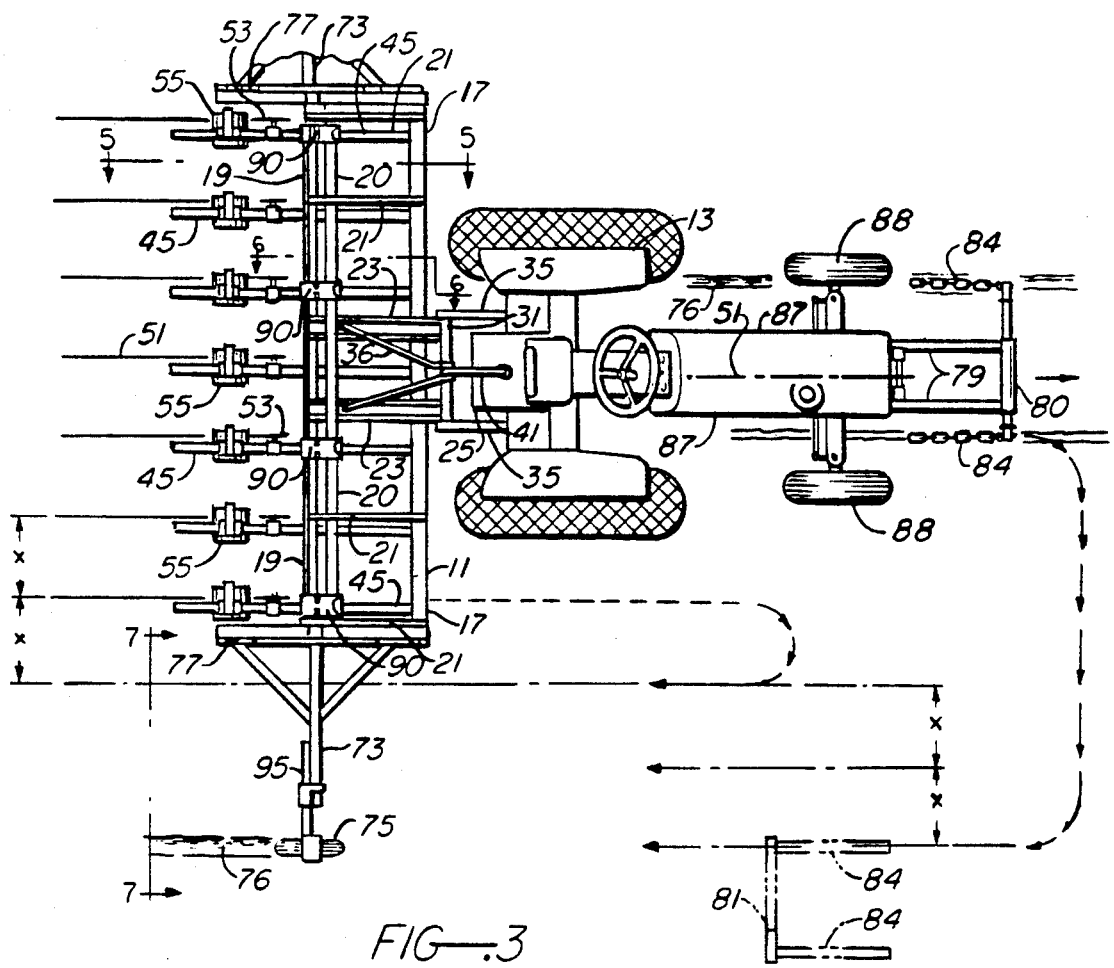
FIG—3
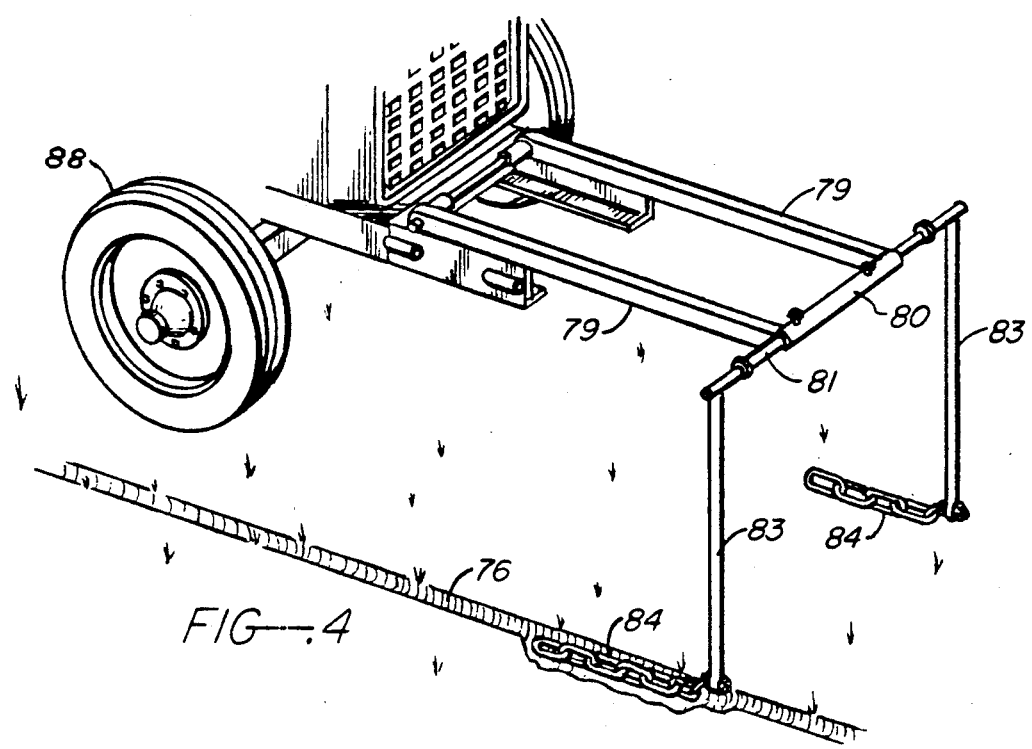
FIG—4

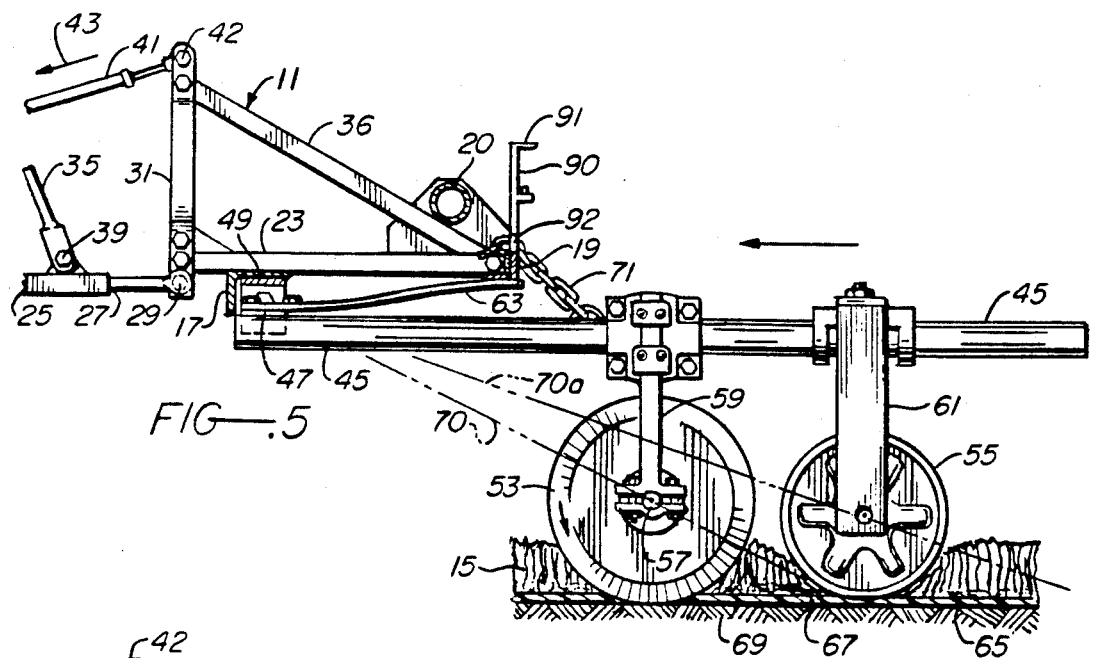
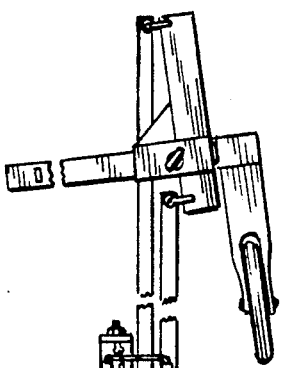
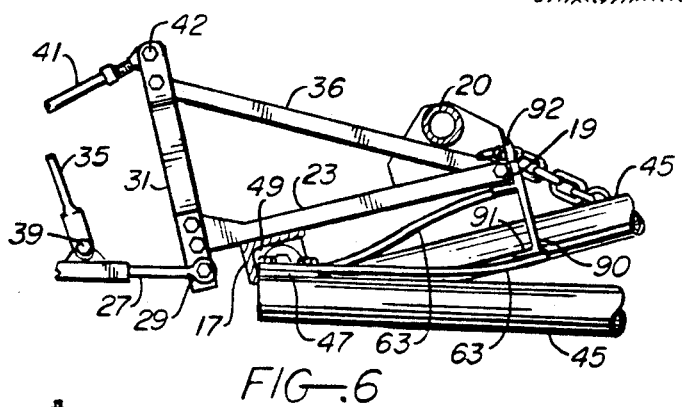
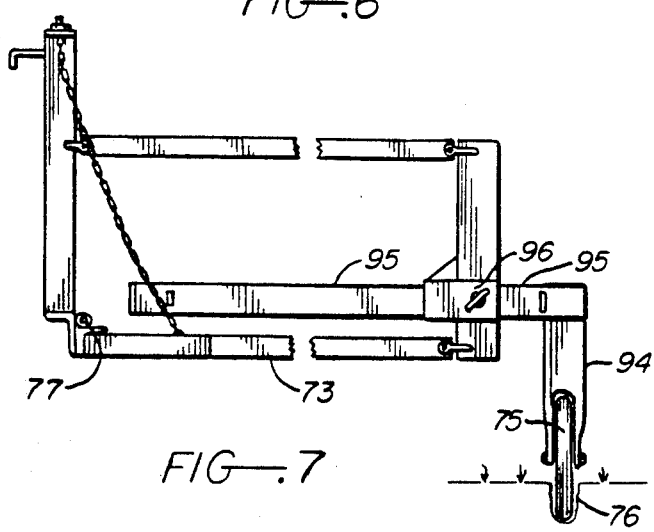

– 1 –

SOD CUTTING MACHINE

BACKGROUND OF THE INVENTION

1. Field of the Invention

The present invention relates to sod cutting machines having special utility on sod farms where sod is grown commercially.

2. Prior Art

Lawn grass is commonly grown from seed in sod farms measuring a number of acres in area, and sod farm acreages in excess of fifty acres are not uncommon. Sod grown in sod farms must be cut in small sections for delivery to the nursery or end user. Commonly each sod section has a rectangular configuration measuring two feet by four feet. The sod sections are stacked or rolled together on pallets on a transport vehicle.

In order to cut the growing sod into rectangular sections, machines having a series of parallel rotary disk cutters have been utilized. The cutter disks are spaced apart in a row configuration transversely of the movement direction of the machine. A farm tractor may be used to pull the machine along the sod surface in a straight line. As the machine is pulled over the sod surface, the cutter disks form parallel slits in the sod surface.

The machine may be pulled back and forth across the grass field to form a large number of parallel slits in the sod surface. Then, by pulling the machine back and forth in a transverse direction, crossing slits are formed in the sod surface. The criss-crossed slits have a checkerboard configuration to define rectangular sod sections sized for removal from the land surface for transportation to a nursery or end user.

When sod is grown directly in the natural earth surface, it is necessary to shave or sever the grass root system from the earth base by moving a knife blade mechanism horizontally underneath the root system. In some cases, sod is grown on plastic sheets previously placed on the earth surface. A sod-growing system of this type is shown in my U.S. Pat. No. 4,934,094. In such situations, it is unnecessary to run a knife mechanism under the sod sections. The rectangular sod sections can be lifted from the plastic sheet without mechanically severing the grass root system from the plastic sheet.

The following U.S. patents show sod cutting machines designed to form crossing slits in growing sod: U.S. Pat. No. 1,706,831 to J. Watson; U.S. Pat. No. 2,051,977 to Winston et al.; U.S. Pat. No. 2,617,347 to H. Provost; U.S. Pat. No. 2,998,081 to Hartmangruber et al.; and U.S. Pat. No. 3,807,504 to J. Nunes, Jr.

SUMMARY OF THE INVENTION

The present invention relates to a sod slitting machine primarily for forming slits in sod grown on plastic sheets. An aim of the invention is to control the depth of cut so that each slit penetrates the plastic sheet without digging into the earth surface in contact with the lower face of the sheet.

Another aim of the invention is to provide a machine which lays down marking lines (or grooves) in the sod surface parallel to the paths taken by cutter disks. A tracker element is supported at the front of the tractor which pulls the sod cutting machine. On the next pass of the machine following such linear marking, the tractor may be steered so that the tracker element follows the straight lines previously marked in the sod surface. In this way, it is possible to achieve nearly exact parallelism between the slits formed on successive passes of the machine. Such parallelism is necessary to the formation of uniform rectangular sod sections, wherein each section has the same size and the same parallel edge configuration. Size and configuration similarity is a preferred characteristic of commercially grown sod sections, because the sod sections can then be laid close against each other without gaps or overlapping, without requiring special care or expertise in the sod-laying process.

Another feature of the invention is that selected ones of the sod cutter elements can be lifted and latched in elevated positions spaced above the sod surface. This feature enables the spacing of the slits in the sod surface to be varied, as is necessary to form rectangular sod sections having different edge dimensions in orthogonal directions, e.g., two feet in one direction and four feet in the other direction. This feature makes it possible to achieve size similarity in the sod section dimensions without adjusting or changing the original pre-set spacing of the cutter elements.

BRIEF DESCRIPTION OF THE DRAWINGS

FIG. 1 is a perspective view of a sod cutting machine embodying the present invention;

FIG. 2 is a perspective view of the FIG. 1 machine, showing selected ones of the sod cutter elements lifted to increase the spacing between slits formed in the sod surface;

FIG. 3 is a top plan view of the FIG. 1 sod cutting machine;

FIG. 4 is a perspective view of a tracker element system installable on the front of a tractor used to pull the FIG. 3 sod cutting machine;

FIG. 5 is a fragmentary side elevational view, taken on line 5—5 in FIG. 3, showing a structural detail of the FIG. 1 sod cutting machine;

FIG. 6 is a view like that of FIG. 5, but illustrating the mechanism in a different position of adjustment;

FIG. 7 is a fragmentary view taken on line 7—7 in FIG. 3, and

FIG. 8 is a view taken like that of FIG. 7, but illustrating the mechanism in a folded standby position.

DESCRIPTION OF THE PREFERRED EMBODIMENT

A sod cutting machine of this invention is shown in its entirety in FIGS. 1 through 3. FIGS. 4 through 8 illustrate structural details of the FIG. 1 machine. The machine includes a generally rectangular frame 11 adapted to be towed behind a tractor 13 in an elevated position above a sod surface 15. FIG. 5 best shows the elevated position of the frame.

Frame 11 may be fabricated out of various bars or frame elements. As shown, the frame comprises a relatively long front transverse bar 17, a relatively long rear transverse bar 19, and four relatively short interconnecting bars 21 which are shown best in FIG. 3.

Frame 11 additionally includes an elongated transverse beam 20 and two horizontal channel elements 23. As viewed in FIGS. 3 and 5, the channel elements extend forwardly beyond transverse bar 17 for attachment to a towing connection 25. The towing connection includes two horizontal links 27 having rear ends thereof pivotably connected at 29 to two upright frame elements 31, the lower ends of which are bolted to respective ones of channels 23. As seen best in FIGS. 1 and 2, frame elements 31 have upper portions thereof converged together to form two closely-spaced ears 33. Frame elements 31 may be reinforced by a diagonal brace means 36.

Towing connection 25 further includes two stabilizer links 35 having upper ends pivotably attached to the tractor frame, as at 37. The lower ends of links 35 are pivotably attached to horizontal links 27, as at 39. The front ends of links 27 (not shown) are pivotably connected to the tractor frame substantially directly below pivot connections 37. Links 35 act as tensioned support devices for the rear end portions of the horizontal links 27.

Towing connection 25 further includes an inclined link 41 whose upper rear end is pivotably connected to the aforementioned ears 33, as at 42. The lower front end of link 41 (not shown) is pivotably attached to a hydraulic piston located in the lower portion of the tractor frame on the tractor centerline. This hydraulic piston is oriented to move horizontally in a rear-to-front direction, under the control of the person driving the tractor. In normal tractor operations, the hydraulic piston serves as an implement draft control mechanism for such implements as plows, discs, bushhogs, etc.

In utilizing the present invention, the hydraulic piston is employed to raise or lower frame 11. FIG. 5 shows the frame in a lowered position, whereas FIG. 6 shows the frame in a raised (tilted) position. The frame-raising operation is achieved by a forward pulling motion on link 41, as indicated by arrow 43 in FIG. 5. This pulling motion is effected by the aforementioned hydraulic piston. As link 41 is drawn forwardly, frame 11 tilts upwardly about pivot connections 29.

Frame 11 forms elevated support means for seven suspension arms 45, each of which comprises a straight cylindrical tube attached at its front end to a bracket 47. Spaced upstanding ears on the bracket nest within flanges on a mating bracket 49 suitably affixed to front bar 17. Rivets or headed pins extend through the mating ears and flanges to form a pivotal connection between bar 17 and the respective suspension arms 45. Each of the seven suspension arms is independently swingably connected to front transverse frame element 17. FIG. 3 is a plan view of the array of suspension arms 45, showing the arm spacing. The seven suspension arms are equidistantly spaced from each other, with each arm extending parallel to the movement axis 51 of the frame 11 - i.e., an imaginary pulling axis along the longitudinal axis of tractor 13. Axis 51 represents the central movement axis of the frame in the sense that axis 51 extends through a central point on the frame.

Each suspension arm 45 serves as a mounting device for a circular sod cutter disk 53 and a circular sod-contact roller 55. Each cutter disk is freely rotatable about the axis of a transverse axle 57 extending from a vertical strut 59 that depends from tubular suspension arm 45. The strut is adjustable longitudinally along arm 45. The peripheral edge of each cutter disk 53 is sharpened to enable the disk to exert a cutting action on the sod when frame 11 is pulled forwardly (right-to-left as viewed in FIG. 5).

Each sod-contact roller 55 is rotatably supported on a vertical leg structure 61 having an annular upper section slidably telescoped onto tubular suspension arm 45. The smooth side surface of arm 45 provides a linear guide for the slidable roller-support structure 61, whereby slidable adjustment of the roller support structure along arm 45 moves roller 55 toward or away from the associated cutter disk 53. Each roller 55 has a relatively large axial dimension, e.g., at least eight inches, such that the roller exerts a substantial downward gripper force on the sod surface. The roller has the function of limiting the depth of cut of the associated cutter disk.

Roller 55 exerts a downward force on the sod surface because of the weight of suspension arm 45, and because of the action of an associated leaf spring means 63 (FIG. 5). The leaf spring means may include a single wide leaf spring or two narrower leaf springs in side-by-side relation. The rear end of the spring means normally abuts an undersurface of frame element 19. The front end of the spring means is bolted or riveted to the associated bracket 47 at the front end of suspension arm 45, so that the rear end of the spring means exerts an upward force on frame element 19. Stress induced in the leaf spring means creates a downward spring force on suspension arm 43. The spring force augments the weight of the suspension arm such that roller 55 has pressure contact with the sod surface. Each suspension arm 45 is equipped with leaf spring means similar to the spring means of FIG. 5. As an alternative to the spring means, a weight could be located on or in the suspension arm to provide a downward biasing force on the arm.

The illustrated machine is designed for use on sod grown on plastic sheeting placed on the bare earth surface. In FIG. 5 of the drawings, the plastic sheeting is indicated at 65. The sod root system is identified by numeral 67. An aim of the invention is to have each cutter disk 53 penetrate sheet 65 without disturbing the subjacent earth layer 69.

The depth of the slit produced by each cutter disk 53 may be controlled by moving the associated roller 55 toward or away from the cutter disk. Movement of the roller toward the cutter disk reduces the depth of the cut, whereas movement of the roller away from the cutter disk increases the depth of the cut. In FIG. 5 an imaginary line 70 extends from the suspension arm pivot axis through the roller sod contact point. A second imaginary line 70a extends from the pivot axis through a second roller sod contact point spaced an increased distance from the cutter disk. When the roller is in the position indicated by line 70a, the roller permits the cutter disk to penetrate a relatively great distance into the sod-earth system before limiting further penetration of the cutter disk. Adjustment of the roller to the position designated by numeral 70 limits the cutter disk to a relatively slight cutting depth. Adjustment of the roller can be utilized to compensate for variations in sod density, sod depth and resiliency (moistness, dryness, etc.).

As noted above, each roller 55 has pressure contact with the sod surface. This is for the purpose of causing the plastic sheet to grip earth layer 69, rather than uncontrollably slipping on the earth surface. As the cutter disk slices into the sod root system, it exerts rightward force (FIG. 5) on the roots located in the vicinity of the disk cutting edge. If roller 55 has sufficient contact pressure with the sod mass, the sod mass to the right of the cutter disk will be clamped in a stationary position. The stationary sod mass will tend to prevent rightward displacement of sod by the cutting action of disk 53; the severed edges of the sod will tend to be straight and uniform, rather than being jagged or irregular.

Each suspension arm 45 can act independently of the other suspension arms in the system. The various cutter disks and associated rollers can thereby traverse undulations in the sod surface without adversely affecting the cutting depth of any cutter disk. FIG. 3 illustrates a machine having seven suspension arms 45 and associated cutter disks. As the tractor pulls the machine in a left-to-right direction, the various cutter disks form parallel slits in the sod surface. Typically, the cutter disks are spaced two feet apart. In one pass of the machine, seven parallel slits are formed in the sod surface (over a transverse dimension of fourteen feet).

Multiple passes of the machine are required to cover an entire sod field. In the usual situation, the tractor will proceed in one direction, then turn around, and proceed in the opposite direction.

Each pass of the machine can have significant length—e.g., one thousand feet or more. If the sod is to be cut into similarly sized sections, it is necessary that the slits formed by disks 53 be parallel and also straight (linear). During the initial pass of the tractor, considerable care is taken to steer the tractor in a straight line, so that the initial seven slits are essentially straight from the starting point to the ending point. A marking and tracking system is incorporated into the machine so that during subsequent passes the tractor can be guided to maintain parallelism among the slits in all of the passes. The number of passes is determined by the transverse width of the sod field. Assuming a sod field width of five hundred feet, approximately seventy-one passes of the cutting machine would be required to cover the field. By incorporating a marking and tracking system, it is possible to maintain substantial parallelism among all of the slits formed during all machine passes.

The illustrated marking system comprises two arm structures 73 extending transversely in opposite directions from frame 11. A relatively thin rubber-tired wheel (roller) 75 is disposed at the outboard end of each arm structure 73. As the sod-cutting machine is drawn over the sod surface, each wheel 75 forms a visible line or depression in the grass surface. Prior to the sod being cut, the grass is usually allowed to grow to a height of at least two inches. During the sod slitting process, rollers 75 depress the contacted grass stems to form a thin visible line 76 in the grass surface. Other types of marking elements can be utilized, e.g., chalk markers or dye markers. Roller 75 represents a relatively low cost device that is effective for purposes of this invention.

Under some conditions, it is desirable to deactivate the marking system, as during transport of the machine to the sod field or during movement of the machine near a fence or other obstruction. Each arm structure 73 has a hinged connection 77 with frame 11, whereby the arm structure can be folded to an upright inactive condition, as illustrated in FIG. 8. A latch device may be incorporated into the mechanism to hold the arm structure in its folded condition. During normal operation (FIG. 7) the hinged connection 77 allows the arm structure to shift up and down so that marking wheel 75 can maintain contact with the sod surface despite undulations in the sod surface.

As shown in FIG. 3, the marker wheel 75 is spaced from the nearest slit by a transverse distance measuring three times the slit spacing dimension X. During the next pass of the machine in a right-to-left direction, the tractor is steered so that a tracking element suspended from the front end of the tractor follows depression 76 already formed by marker wheel 75.

The tracking system shown in FIG. 4 comprises two forwardly extending arms 79 suitably mounted on the front end of the tractor. A sleeve 80 extends transversely across the leading ends of arms 79 to support an axle (rod) 81. Posts 83 extend downwardly from the ends of axle 81 to points near the sod surface. Chains 84 are attached to the lower ends of the posts for dragging motions on the sod surface. Frictional forces between the chains and the sod surface may tend to retard movement of the chains along the grass surface. However axle 81 can swivel in sleeve 80 to permit posts 83 to swing in vertical arcs, thus to enable the chains to move freely over the grass surface without undue stress on the posts. Each chain 84 constitutes a sod-contacting tracking element adapted to follow a previously-formed line (or depression) 76 formed by a marking wheel 75.

The tractor is steered so that one of the chains 84 is caused to lie in a previously formed depression 76. Posts 83 and chains 84 are aligned with two of the cutter disks 53 on the trailing machine, so that when the tractor is moving in the reverse direction (right-to-left in FIG. 3) the endmost cutter disks 53 form a new slit spaced from the previously formed endmost slit by the common distance X. All of the slits are thus spaced apart by this common distance X.

When the tractor reaches the end of the reverse pass, it is turned again to make another pass in a left-to-right direction, as viewed in FIG. 3. In each case, the marker wheel 75 and tracking chain 84 on the inner turn radius are used to maintain the slits' spacing and parallelism. The other wheel 75 and tracking chain 84 (on the outer radius) are ignored. As viewed in FIG. 3, the lowermost tracking chain 84 is used for steering guidance when the tractor is moving in a right-to-left direction. The uppermost tracking chain 84 is used for steering guidance when the tractor is moving in a left-to-right direction.

Each tracking chain is disposed along a pathline extending between a side surface 87 of the tractor and the associated front tractor wheel 88, as viewed in FIG. 3. A person seated on the tractor seat has a line of sight to either chain for guidance in steering the tractor on the desired course, thus to maintain the chain in the previously formed depression. The two posts 83 and chains 84 are spaced apart by a distance 2X, where X is the spacing between adjacent slits formed by cutter disks 53. With a slit spacing of two feet, posts 83 are spaced apart by a distance of four feet.

The illustrated sod cutting machine can be used to form transverse slits in the sod field, i.e., vertically as viewed in FIG. 3. In preferred practice of the invention, the transverse slits are spaced apart by a distance 2X, i.e., twice the slit spacing shown in FIG. 3. With such an arrangement, the criss-crossed slits will form rectangular sod sections measuring two feet in one direction and four feet in the other direction.

The slit spacing can be doubled by raising alternate ones of suspension arms 45, as shown in FIG. 2. Four of the cutter disks 53 are lowered into cutting contact with the sod surface, while the other three cutting disks are elevated above the sod surface. FIG. 6 fragmentarily illustrates one of the three elevated disks and one of the four lowered disks. FIG. 2 shows all seven suspension arms (three elevated and four lowered).

To elevate three of the cutting disks, frame 11 is tilted upwardly to the FIG. 6 position by actuation of the aforementioned hydraulic pistons. Each of the three suspension arms 45 has a latching chain 71 connected to it. The free end of each chain can be temporarily attached to an anchorage on transverse frame element 19 prior to actuation of the hydraulic piston. When frame 11 is tilted up to its FIG. 6 position, the three raisable suspension arms 45 are lifted with the frame by means of chain connections at 71. The other four suspension arms remain in their lowered positions.

In order to maintain a downward spring bias on each lowered suspension arm, a pivotable abutment plate 90 is hingedly connected at 92 to the upper edge of frame element 19 in the space directly above each of the four lowered suspension arms. The plate can be manually swung to the FIG. 6 position wherein flange 91 on the plate overlies the rear end of the associated leaf spring means 63. Flange 91 acts as a spring abutment, performing the function of frame element 19 in the FIG. 1 arrangement.

With four of the suspension arms 45 lowered and the other three suspension arms raised, as shown in FIG. 2, the cutting machine can be pulled back and forth transversely across the slit pattern shown in FIG. 3, thus forming a criss-crossed (checkerboard) slit pattern. The spacing of the transverse slits is double the slit spacing shown in FIG. 6, e.g., four feet. Each sod section has a length of four feet and a width of two feet.

During transverse movement of the machine in its FIG. 2 mode, the marking wheel 75 and tracking chains 84 may be used for guidance of the tractor steering function. However, each marker wheel 75 is then required to achieve a four foot separation of the endmost slits in successive passes of the machine. Therefore each marker wheel 75 is adjusted outwardly from its FIG. 3 position by a distance X—i.e., two additional feet in a preferred arrangement. FIG. 7 shows one means for adjusting each marker wheel. The wheel support arm 94 is attached to a slide member 95 that extends through a rectangular tubular guide 96 carried by arm structure 73. Gradations can be marked on member 95 to designate different wheel locations.

The drawings show a machine having seven suspension arms and associated cutter disks. However, machines may be designed with a lesser or greater number of suspension arms. Preferably, there are at least five suspension arms and associated cutter disks. Also, there are preferably an odd number of suspension arms—e.g., five arms or seven arms or nine arms, with alternate ones of the arms being raisable.

Thus there has been shown and described a novel sod harvesting machine which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. A sod cutting machine comprising:
   an elongated frame having a left end and a right end,
   means on said frame midway between its ends for attaching the frame to a tractor so that the frame can be towed in an elevated position above a sod surface behind the tractor,
   a plurality of parallel suspension arms pivotably connected to said frame at spaced points therealong, each suspension arm being independently swingable in a vertical arc about its pivotable connection with said frame,
   a sod-cutter element carried by each suspension arm, whereby when the frame element is towed by the tractor over the sod surface the cutter elements form parallel spaced slits in the sod surface,
   a sod-contact roller carried by each suspension arm behind an associated sod-cutter element, each roller having an appreciable width for exerting substantial downward pressure on the sod surface, each roller spanning a slit in the sod surface formed by the associated sod-cutter element, whereby each said roller exerts a holding force on sod sections formed by the slit,
   left and right sod marking elements carried by the frame outboard of said suspension arms, each marking element being spaced from the associated endmost sod-cutter element by a distance which is a multiple of the spacing between adjacent sod-cutter elements, and
   left and right tracking elements mountable on the front end of the tractor for following lines previously formed in the sod surface by the marking elements, said tracking elements being located approximately equidistant from the tractor longitudinal axis in proximity to the tractor front wheels, whereby a person driving the tractor may readily view both tracking elements for steering the tractor along a path wherein a selected tracking element is enabled to closely track a line previously formed by one of the marking elements,
   said frame being towable back and forth in opposite directions to accomplish successive passes over a sod field, said marking elements being so oriented to the tracking elements that during one pass of the frame the right tracking element follows the line formed by the right marking element during the previous pass, and during the next pass the left tracking element follows the line formed by the left marking element during said one pass.

2. A sod cutting machine according to claim 1, wherein:
   each tracking element comprises a sod-contacting element located a substantial distance in front of the towing tractor.

3. A sod cutting machine according to claim 2, and further comprising:
   means for suspending said tracking elements in front of the towing tractor, said suspending means comprising a transverse support element spaced above the sod surface, and two transversely-spaced posts extending downwardly from said support element, each post having an upper end swingably connected to said support element and a lower end in near proximity to the sod surface,
   each sod contacting element comprising a chain attached to the lower end of one of said posts for disposition on the sod surface.

4. A sod cutting machine comprising:
   an elongated frame having a left end and a right end,
   means on said frame midway between its ends for attaching the frame to a tractor so that the frame can be towed in an elevated position above a sod surface behind the tractor,
   said tractor attaching means including inclined link means connectable to an implement draft control means on the towing tractor, whereby the inclined link means can be pulled forwardly to tilt the frame upwardly to a tilted position,
   at least five parallel suspension arms pivotably connected to said frame at spaced points therealong, each suspension arm being independently swingable in a vertical arc around its pivotable connection with said frame, a sod cutter element carried by each suspension arm, whereby when the frame element is towed by the tractor over the sod surface the cutter elements form parallel evenly-spaced slits in the sod surface, and a sod-contact roller carried by each suspension arm behind an associated sod cutter element, each roller having an appreciable width for exerting substantial downward pressure on the sod surface, each roller spanning a slit in the sod surface formed by the associated sod cutter element, whereby each said roller exerts a holding force on sod sections formed by the slit, latch means carried by each individual suspension arm for selectively securing the suspension arm to said frame, said latch means being individually operated so that alternate ones of the suspension arms can be latched to the frame when the frame is in its tilted position to double the spacing between the spaced slits in the sod surface.

5. A sod cutting machine according to claim 4, wherein:

there are seven suspension arms, and said suspension arms comprise first, second, third, fourth, fifth, sixth and seventh arms evenly spaced along said frame from the left end of said frame to the right end of said frame, said second, fourth and sixth arms being raisable from the sod surface by an upward tilt motion of the frame to its raised position, whereby the first, third, fifth and seventh sod cutter elements are enabled to form spaced slits in the sod surface which are spaced twice the spacing of the sod cutter elements.

6. A sod cutting machine according to claim 5, and further comprising:

left and right sod marking elements carried by the frame outboard of said seven suspension arms, each marking element being spaced from an associated endmost sod cutter element by a distance which is a multiple of the spacing between adjacent sod cutter elements, and means at each end of said frame for adjustably supporting each marking element for adjusting motions toward or away from the endmost sod cutter elements so that (1) when all seven sod cutter elements are engaged with the sod surface each marking element is spaced from the associated endmost sod cutter element by a distance three times the unit spacing between the sod cutter elements, and (2) when only the first, third, fifth and seventh sod cutter elements are engaged with the sod surface, each marking element is spaced from the associated endmost sod cutter element by a distance four times the unit spacing between the sod cutter elements.

7. A sod cutting machine according to claim 4, wherein:

each said latch means comprises a chain having one end thereof connected to an associated suspension arm and its other end connectable to said frame.

8. A sod cutting machine comprising:

an elongated frame having a left end and a right end, means on said frame midway between its ends for attaching the frame to a tractor so that the frame can be towed in an elevated position over a sod surface behind the tractor, a plurality of parallel suspension arms pivotally connected to said frame at evenly spaced points therealong, each suspension arm being independently swingable in a vertical arc about its pivotable connection with said frame, said frame having a longitudinal axis extending through the tractor attaching means, said suspension arms being individually swingable in vertical planes parallel to the longitudinal axis, a sod cutter disk rotatably connected to each suspension arm for cutting slits in the sod surface, a sod-contact roller carried by each suspension arm behind the associated cutter disk, each roller having an appreciable width for exerting substantial downward pressure on the sod surface, each roller spanning a slit in the sod surface formed by the associated cutter disk, whereby each said roller exerts a holding force on sod sections formed by the slit, and means for slidably adjusting each sod-contact roller longitudinally along the associated suspension arm, each suspension arm having a smooth side surface which provides a linear guide, each said slidable adjustment means comprising a slide element positioned on the associated linear guide for movement therealong.

9. A sod cutting machine according to claim 8, and further comprising:

an individual spring means trained between said frame and each respective suspension arm to exert a downward bias on the respective arm, each spring means comprising a leaf spring having one end thereof affixed to the respective arm and the other end abutting said frame.

* * * * *